(12) United States Patent
Warmack et al.

(10) Patent No.: US 6,516,714 B2
(45) Date of Patent: Feb. 11, 2003

(54) NUT CRACKING APPARATUS (76) Inventors: Clarence Lloyd Warmack, 7910 Malone Dr., Donalsonville, GA (US) 31745; Barry Shawn Warmack, Rte. 2 Box 309, Pavo, GA (US) 31778

( * ) Notice: Subject to any disclaimer, the term of this patent is extended or adjusted under 35 U.S.C. 154(b) by 0 days.

(21) Appl. No.: 09/853,914

(22) Filed: May 12, 2001

(65) Prior Publication Data

US 2002/0166464 A1 Nov. 14, 2002

(51) Int. Cl.$^7$ ................................................. A23N 5/00
(52) U.S. Cl. ............................. 99/574; 99/568; 99/580
(58) Field of Search .......................... 99/574, 571, 568, 99/580, 617

(56) References Cited

U.S. PATENT DOCUMENTS

| | | | |
|---|---|---|---|
| 1,834,347 A | | 12/1931 | Nixon |
| 2,259,939 A | | 10/1941 | Garcia |
| 2,757,695 A | * | 8/1956 | Valdes ........................ 99/574 |
| 2,806,496 A | | 9/1957 | Waring |
| 3,059,678 A | * | 10/1962 | Staples ....................... 99/574 |
| 4,201,126 A | | 5/1980 | Evans |
| 4,597,977 A | * | 7/1986 | Brown ..................... 99/574 X |
| 5,325,769 A | | 7/1994 | Filice et al. |
| 5,931,087 A | | 8/1999 | Spencer |
| 6,098,530 A | | 8/2000 | Hemry |
| 6,209,448 B1 | * | 4/2001 | Hagen ......................... 99/575 |

OTHER PUBLICATIONS

Parts lists and drawings from Quality Shellers, P.O. Box 4925, Rocky Mount, NC 27803, Copyright 1994, 5 pages.

\* cited by examiner

Primary Examiner—Reginald L. Alexander
(74) Attorney, Agent, or Firm—Brian D. Bellamy (57) ABSTRACT

The present invention is a nut cracker apparatus that will successfully and efficiently crack nuts and separate the meat from the shell. To enable successful cracking the present invention comprises a housing having an inlet and outlet. Interiorly located in the housing is a rotatable horizontally disposed drum. A shaft having a plurality of paddles extends centrally through the drum. Secured to the wall of the drum is a plurality of removable screens. Nuts are fed to the inlet into the rotatable drum. During rotation, the paddles impart a force on the nuts causing them to crack and having the shells dislodge from the meat. The screens enable the appropriately sized meat to fall therethrough.

9 Claims, 7 Drawing Sheets

NUT CRACKING APPARATUS

BACKGROUND OF THE INVENTION

1. Field of the Invention

The present invention relates generally to a nut cracking apparatus and more particularly to a nut cracking apparatus that includes a unique rotating drum configuration that enables nuts to be cracked continuously, efficiently and successfully regardless of their type and size and with minimal supervision.

2. Description of the Prior Art

It has long been recognized that there exists a multiplicity of devices that are specifically designed for nut cracking. Some of these devices utilize a rotatable member or the like to crush the nut. For example in U.S. Pat. No. 6,098,530 issued to Hemry, there is disclosed a mechanical nut cracker that includes a crusher assembly having a crusher bar rotationally attached to an end of a base member. A crusher plate assembly is coupled to the base member and is in proximity to the crusher assembly. This provides for a gap to be located between the crusher bar and crusher plate assembly. In use the crusher plate assembly can be adjusted to increase or decrease the size of the gap. This provides for a cracker apparatus that can accept any size nut.

Other devices exists that offer unique means of crushing, such as the device disclosed in U.S. Pat. No. 5,325,769 issued to Filice et al. In this patent, a mechanism for cracking nuts is disclosed. This mechanism uses a rotating member having a plurality of cells. Each cell includes a plate and receives a nut. The nut can rest against this plate. The cells employ cracking heads. A striker or impact producing device imparts an impinging force to any of the cracking heads to crack the nut between the cracking bead and plate within each of the cells.

Figure 1:
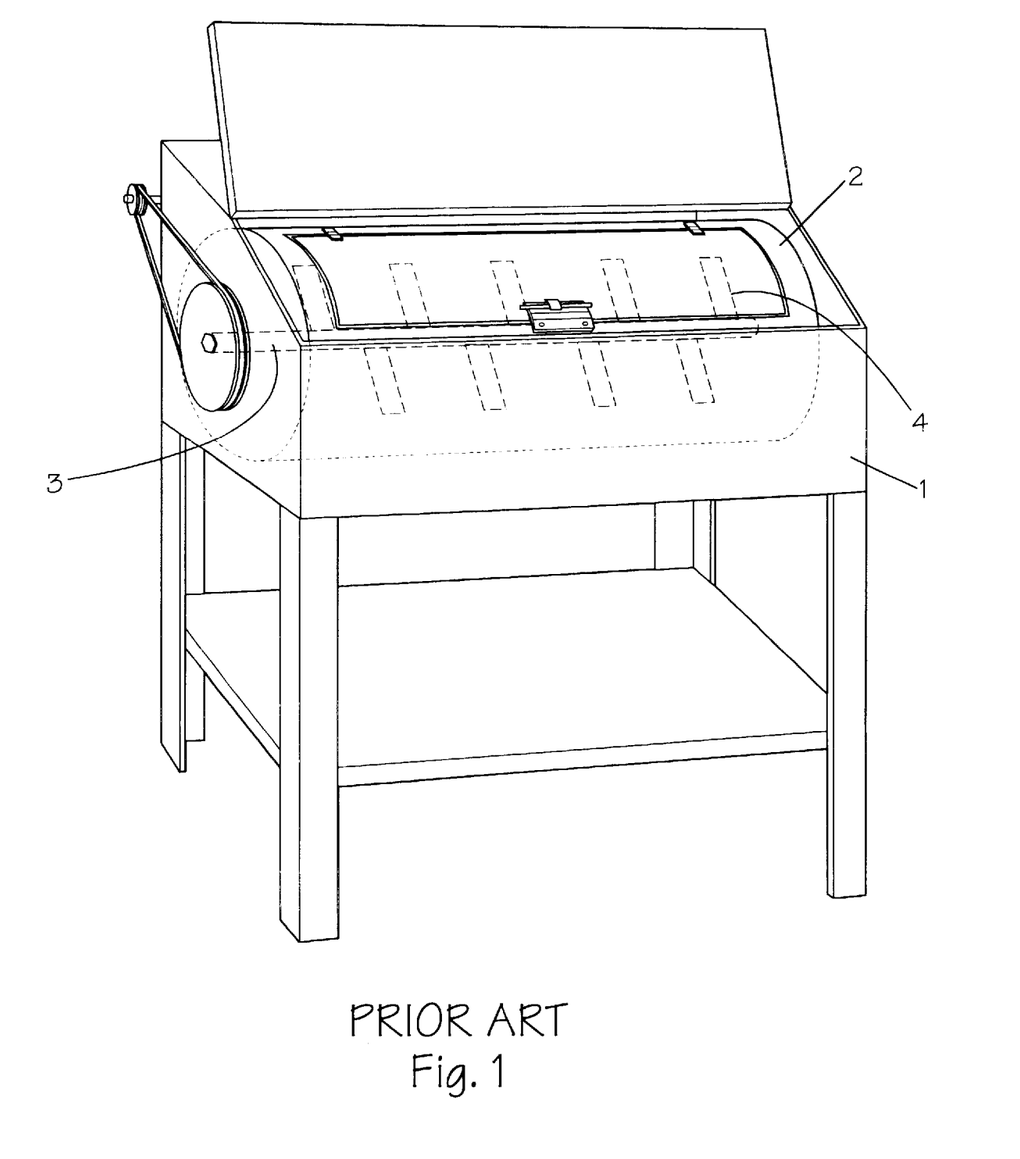
FIG. 1 is a perspective view of a conventional nut cracker apparatus, typically used for cracking nuts.

Other devices that are well known in the art use a rotatable drum assembly. An example of a nut cracker utilizing a rotatable drum assembly is shown in FIG. 1. Shown is a pecan cracker manufactured by a Quality Shellers. This product includes, a housing 1 having a drum 2 located therein. A shaft 3 extends through the drum and a plurality of paddles 4 are secured to this shaft. A lid is located on the drum to enable access to the interior of the drum. In use the operator lifts the lid and inserts the nuts and then activates the machine. After a period of time, the user deactivates the machine, lifts the lid and removes the cracked nuts.

Though the cracking devices described above have proven to be successful, they offer products that tend to be bulky in design and cumbersome for use. Due to the excess of mechanical features, these products provide continual maintenance requirements. In addition, replacement and/or repairs of parts can be costly and tedious to accomplish.

Accordingly, it is seen that there is a need to provide a nut cracker apparatus that is successful in operation yet simple in design. This nut cracker should include a means of accepting any size and type of nut, so as to provide for an apparatus that is versatile as well as productive.

As will be seen, the present invention achieves its intended purposes, objectives and advantages by accomplishing the needs as identified above, through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention is a nut cracker apparatus designed and configured to successfully crack nuts regardless of their type and size. Due to the simplified design, a minimal amount of components are utilized for rendering proper cracking capabilities. The reduction of components substantially reduces the probability of component failure and thus innately increases the dependability of the present invention, while not compromising on the quality and success of the end product.

To accomplish efficient cracking while maintaining the simplicity of design, the present invention comprises a housing having a rotatably mounted drum horizontally disposed therein. The drum includes an enclosed end and an open end. Extending across the open end is a pair of bars that form a cross configuration. Due to the capability of rotation of the drum, a gap is located between the open end and the housing. The gap is sized appropriately to render free rotation of the drum, yet will sized so as to prevent nuts from descending therethrough. Secured to the housing and in proximity to the open end is a hopper. This hopper receives nuts and is structured so that an adequate amount of nuts can be loaded so as to eliminate the need for constant monitoring.

Internally and centrally located in the hopper area is a plurality of paddles. The paddles are secured to a central shaft, which is coupled to a rotating device. Circumfercially disposed on the wall of the drum is a plurality of screens. The screens can be removable and are designed to filter the nuts and thus will enable the meat of a particular nut to fall between the opening of the screen and exit the drum. The fallen meat will travel from the drum to an outlet located on the lower area of the housing.

In use, an actuating device will enable the central shaft to rotate. This will cause the paddles to move and the drum to revolve. As the nuts are placed in the hopper, gravity causes the nuts to enter the drum via the inlet. Once inside the drum, the nuts collide with the paddles. The impact with the paddles causes the shell of the nuts to crack and break away from the meat. Once free, the meat and the pieces of shell from the nut fall through the screen(s) and to the exit of the housing. The speed of the drum rotation is regulated to provide for optimum cracking and separation of the nut's meat into whole halves.

Accordingly, it is an object of the present invention to provide a nut cracking apparatus that will overcome the deficiencies, shortcomings, and drawbacks of prior nut crackers and methods thereof.

Another object of the present invention is to provide a nut cracker apparatus that can be successfully configured to accommodate any size nut, while providing an apparatus that includes minimal supervision during its operation.

Yet a further object of the present invention, to be specifically enumerated herein, is to provide a nut cracker apparatus in accordance with proceeding objects and which will conform to conventional forms of manufacture, be of simple construction and easy to use so as to provide a nut cracker that would be economically feasible, long lasting and relatively trouble free during utilization.

Although there have been many inventions related to nut crackers, none of the inventions have become sufficiently compact, low cost, or reliable enough, to become used repeatedly without loss of efficiency in cracking nuts. The present invention meets the requirements of the simplified design, compact size, low initial cost, low operating cost, ease of installation and maintainability, and minimal amount of training to successfully employ the invention. In addition, the present invention cracks nuts efficiently while utilizing a minimally amount of manpower to successful crack nuts and render a separate of the meat from its shell.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DETAILED DESCRIPTION OF THE PREFERRED EMBODIMENT

With reference to the drawings, in particular to FIGS. 2–7 thereof, the present invention, a nut cracker apparatus device, denoted by reference numeral 10 will be described. Shown is a nut cracker apparatus 10 comprising a housing 12 having an upper portion 14 and a lower portion 16. This housing can be mounted to a frame member 18 in order to provide for the housing to be in an elevated position.

Figure 2:
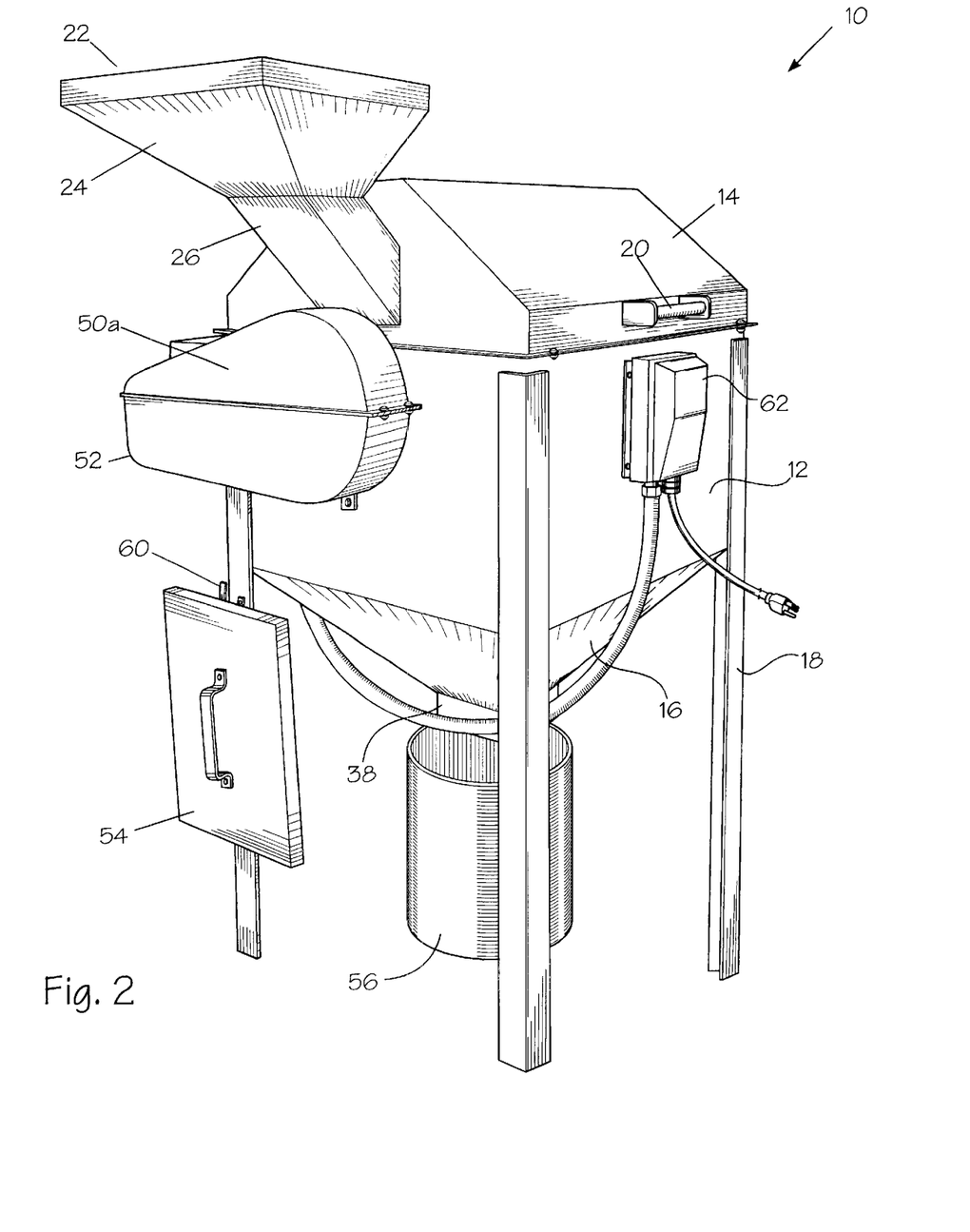
FIG. 2 is a front perspective view of the nut cracker apparatus of the present invention, wherein the housing is in a closed and useable position.
Figure 3:
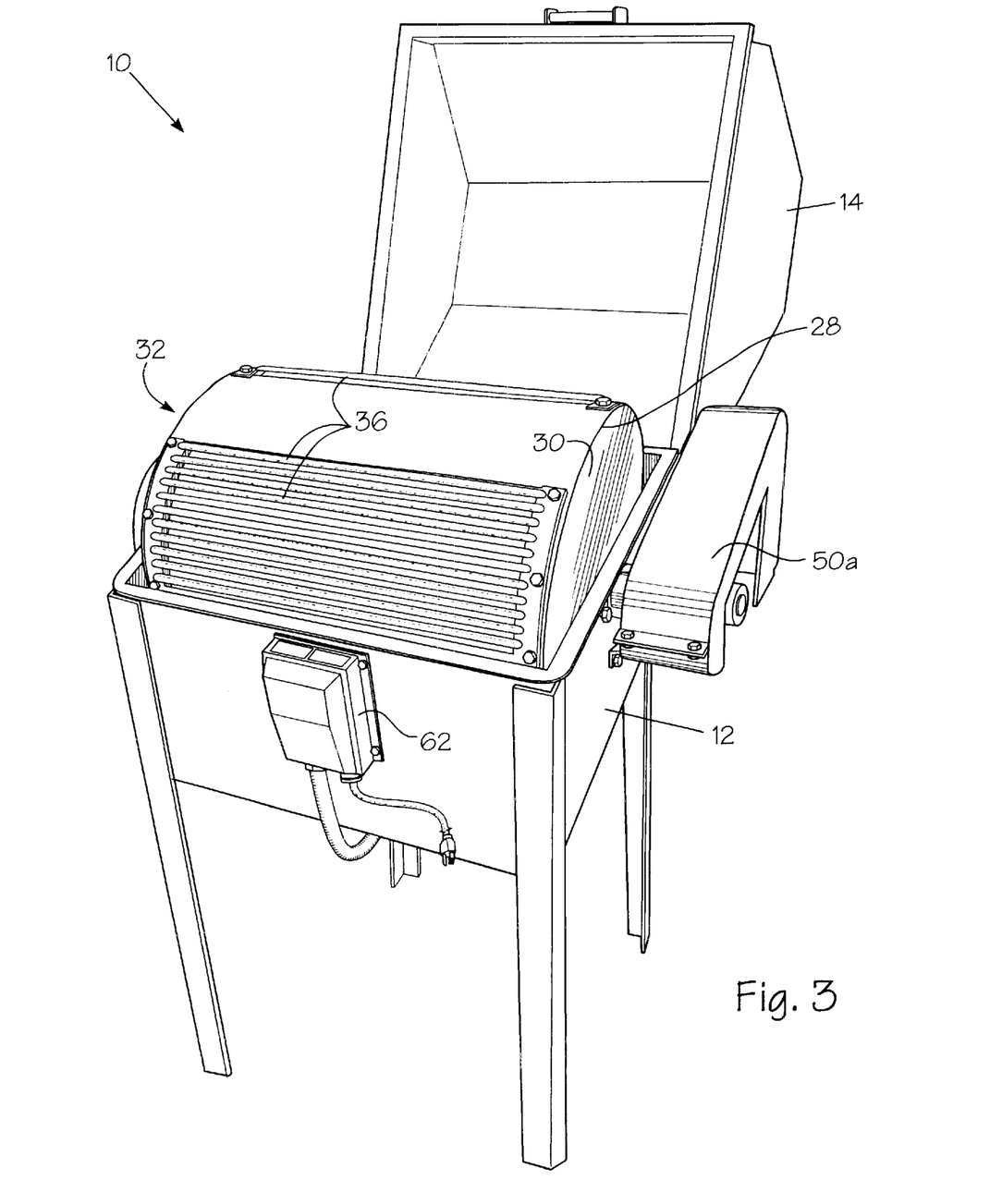
FIG. 3 is a front perspective view of the nut cracker apparatus of the present invention, wherein the housing is an open position.
Figure 4:
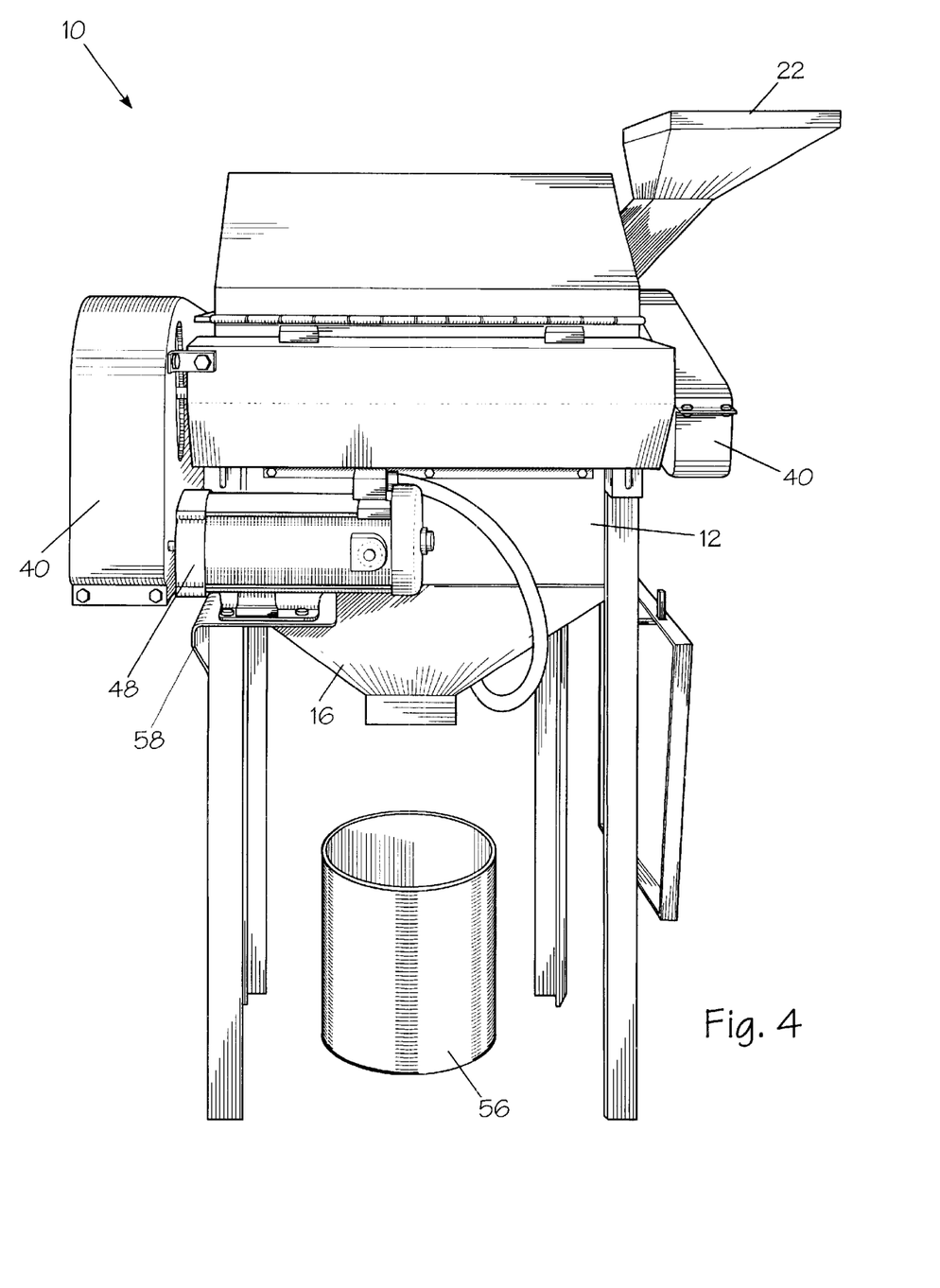
FIG. 4 is a rear planar view of the nut cracker apparatus of the present invention.
Figure 5:
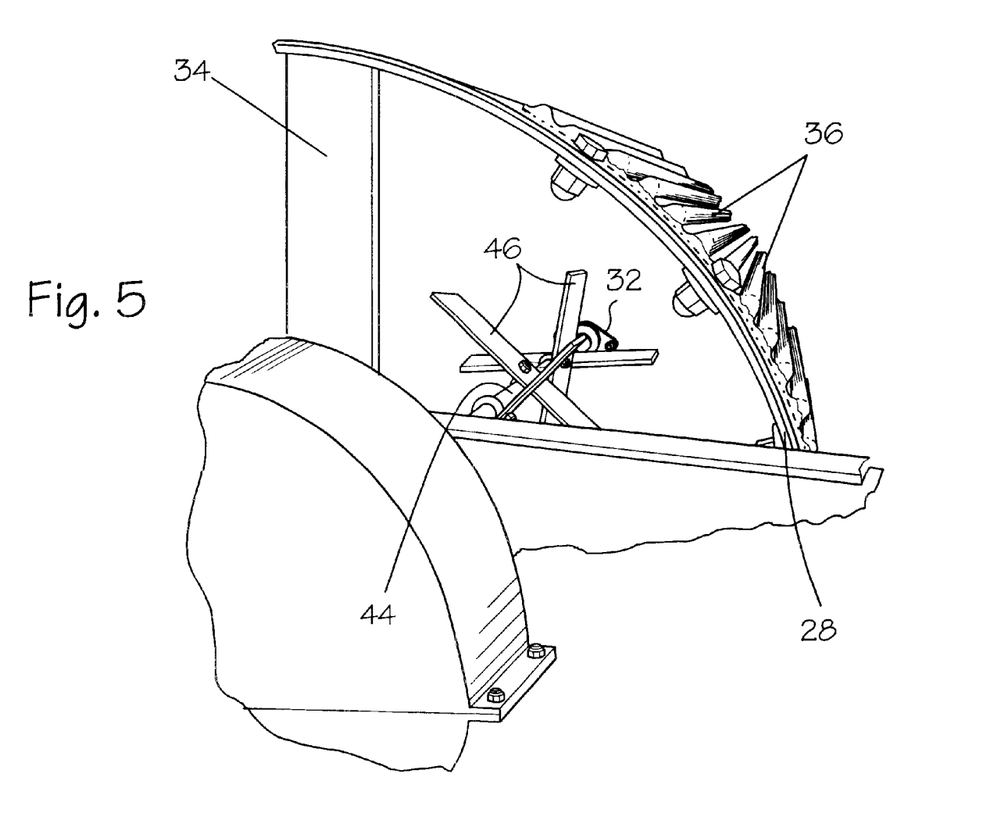
FIG. 5 is a partial perspective side illustrating the interior of the drum that is used with the nut cracker apparatus of the present invention.
Figure 6:
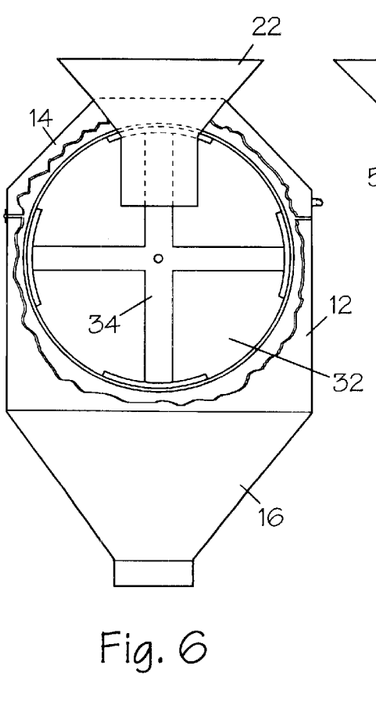
FIG. 6 is a side planar view of the housing illustrating the open end of the drum that is used with the nut cracker apparatus of the present invention.
Figure 7:
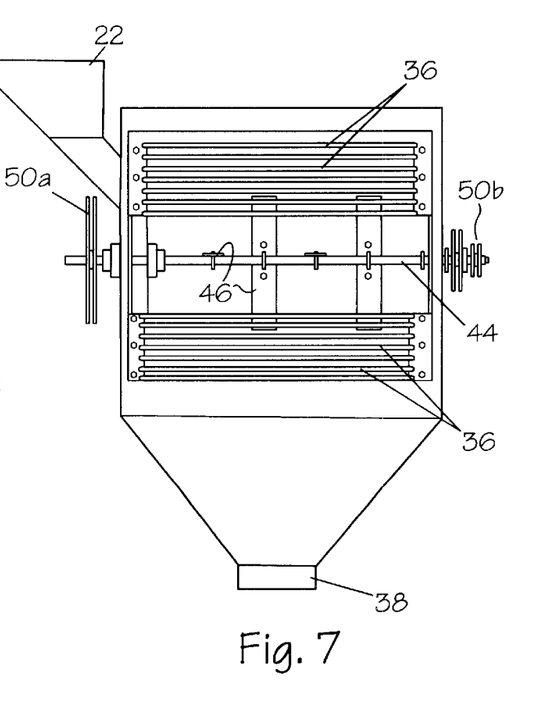
FIG. 7 is a front planar view of the drum secured to the housing that is used with the nut cracker apparatus of the present invention.

The upper portion 14 of the housing 12 is hingedly secured to the lower portion 16. This provides for the upper portion to have the capabilities of being lifted upward in order to expose and have access to the interior area of the housing 12. To ease in the lifting or lowing of the upper portion 14, a handle 20 or the like, can be exteriorly secured thereto. Extending though a side wall of the upper portion is a through hole, which is an inlet of the housing.

Exteriorly secured to the inlet of the housing is a hopper 22. This hopper, as seen in the figures, includes two sections. The first section is an upper section or receiving member 24 and a second section that is a lower section or feeder 26. This feeder extends into the through hole that is located on the side wall of the upper portion of the housing 12. As seen in the figures, the receiving member 24 has a substantially funnel-like configuration to provide for a gradual decrease in size from its top to its lower end.

Shown in the figures, this feeder 26 is located between the receiving member and the housing. Its attachment is angular so as to render for the feeder to be angularly secured to receiving member 24 and also be angularly attached to the housing. The feeder has a tunnel-like configuration. The receiving member is disposed slightly above the housing, so as to permit gravity to force the nuts downward. The angular arrange and tunnel configuration of the feeder will allow for the nuts to enter the housing gradually, continuously, and at a substantially controlled flow rate.

Secured interiorly in the housing is a drum 28. This drum is horizontally disposed and includes an enclosed end 30 and an open end 32. Extending across the open end 32 are bars 34. The bars 34 form a cross configuration. The bars provide structurally support to this open end.

The nuts enter into the drum via this open end. Circumferencially disposed on the drum's wall is a plurality of screens 36. The screens are preferably removable to provide for the screens to be removably secured to the drum via any type or style of conventional attaching devices, such as, but not limited to the use of nut and bolts as illustrate, sliding attaching mechanisms or the like. The purpose of the screens is to enable the properly sized meat and shells of the particular nut to fall from the interior of the drum through the screen and to an outlet 38, located at the lower portion of the housing 12. The screens will also prevent nuts not sufficiently cracked and separated from escaping therefrom.

Having removable attaching devices on the screens enables their removal. This configuration will allow for the screens to be changed. Changing the screens provides for a cracker that can be customized for accommodating a particular size nut. The use of interchangeable screens adds to the versatility and usability of the present invention.

The screens can include any configuration and thus can be grid or can be fabricated to include a plurality of longitudinal slots, as illustrated. The size and number of screens is dependent on the particular nut that is being cracked. For example screens used to crack walnuts will have larger gaps or grids than screens utilized for cracking hazelnuts.

Figure 8A:
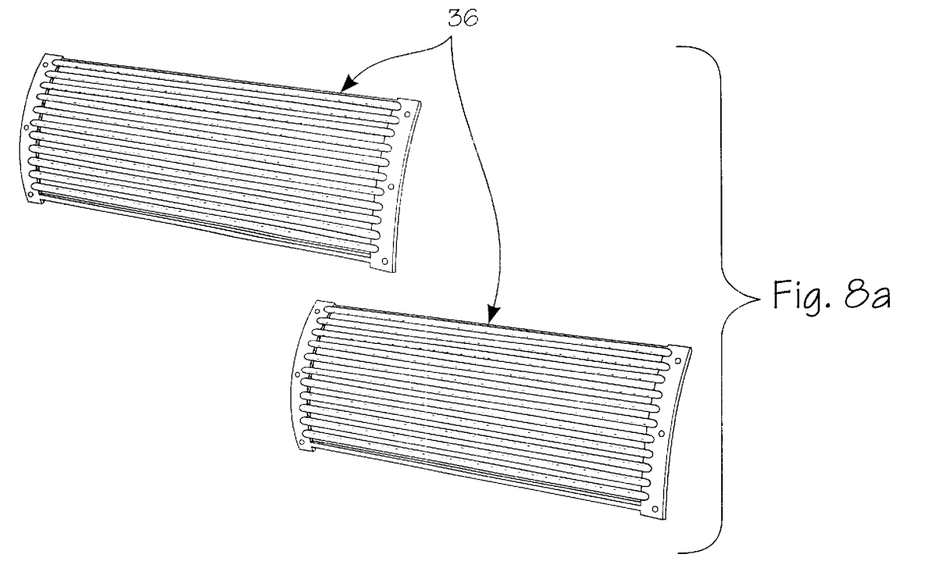
FIGS. 8a and 8b show the two sets of screen having varied size openings.
Figure 8B:
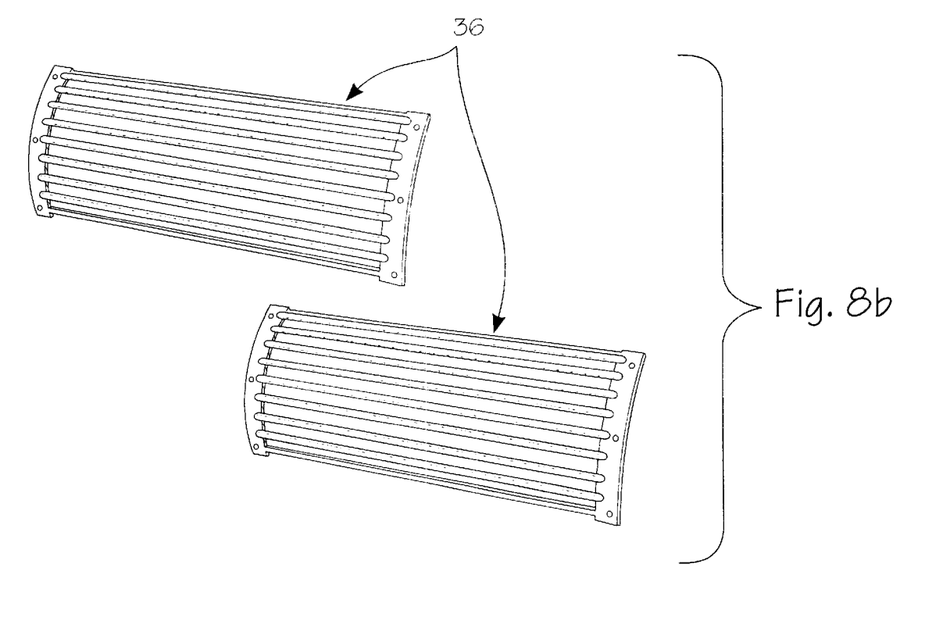

In the preferred embodiment, and what has been utilized to produce favorable results, is to provide for the drum to include a preceding solid portion and a subsequent screen portion. This arrangement will provide for an alternating configuration of solid and screened areas. What has proven to be successful is to include sets of screens wherein each screen of the particular set would be of the same size and shape. In addition, the screens of the particular set would be attached on the drum so as to provide for the screens to be evenly spaced from one another, as shown in the drawings. The variation of each set would be in the size of the openings or gaps as illustrated by FIGS. 8a and 8b, which is dependent on the nut that is to be cracked. Preferably, and what has exhibit superior results is to provide for each set to include four screens including gaps or slots having opening that differ in size by approximately $1/32$ to $7/16$ of an inch. Sets including clearances of about $1/32$ of an inch and about a $3/8$ of an inch have been used repeatedly to produce constant and successful results. It is noted that the gap of the slots or screens can be altered and is contingent upon the size and type of nut that is placed in the cracker device of the present invention.

For aiding in the cracking process the interior of the drum can include a flange 40. The flange 40 is preferably secured to a non-screen portion and substantially extends the entire horizontal length of the drum. This arrangement will provide for the flange to lift the nuts as the drum turns.

An actuating device extends through the housing 12 and into the drum 28. This actuating device provides for the drum to be interiorly secured and rotatably mounted to the housing 12. A gap 42 is located between the open end 32 of the drum 28 and interior of the housing 12. This gap is appropriately sized for preventing any type nut from falling therein. Thereby, forcing the nuts into the open end for implementing a continuous feed process.

Extending centrally through the drum is a shaft 44. Secured to the shaft 44 is a plurality of paddles 46. Coupled to the shaft is the actuating device that enables the shaft to rotate, inherently causing the rotation of the paddles.

The actuating device comprises a motor 48 that is coupled to a first and second conventional pulley systems, 50a and 50b, respectively. This configuration of utilizing a singular motor for controlling more than one pulley means is known and is able to function due to the use of a transfer shaft (illustrated in outline, but not labeled) that couples each pulley system to the shaft of the motor. In the present invention, the first pulley system 50a is coupled to the drum 28, thus providing for the rotation of the drum. The second pulley system 50b is coupled to the central shaft 44 and thus enables the rotation of paddles. In the preferred embodiment, the drum operates at a slower speed than the paddles, thus providing for the gearing ratios of the first pulley system to be larger in diameter than the gearing ratios of the second pulley system. This faster speed for the central shaft will allow for the paddles to sufficiently impact the nuts for providing successfully cracking. In the embodiment illustrated, using a singular motor for controlling each pulley system provides for a device having a proportional speed control ratio. It is noted that this configuration can be altered to provide for a system wherein each pulley system is controlled individually by providing for each to include their own motor assembly. In addition, other means can be utilized for the actuation device, such as, but not limited to the use of a solenoid; the use of a magnetic system; the use of a ratcheting system; or the like. Thereby providing for any combination for the actuating unit.

Various features can be added for enhancing the final product. Covers 52 can be secured over the transfer shaft and the first and second pulley systems for preventing debris and the like to be entrapped therein. A lid 54 can be removably secured to the receiving end of the hopper for placement when the apparatus 10 is not in use. For catching and storing the cracked nuts, a receptacle 56 can be located in proximity to the outlet 38 of the housing. Shelves 58 and storage elements 60, such as hooks, can be mounted to the frame member for storing and maintaining various items, such as the motor, receptacle, lid or the like. To make the apparatus transportable, lockable wheels can be secured to the frame member.

A variable speed control 62 can also be provided for enabling the operator to choose the speed of the rotation of the drum and shaft that is best suited for the particular nut. This variable speed control will assists the operator in finding the optimum speed for cracking the shell for removal of the meat in whole of halve products. Some nuts, such as hard-shelled nuts, will require higher speeds for enabling successful cracking.

In use, the operator selects the set of screens that will be utilized on the drum. Once selected, the user lifts the upper portion of the housing to expose the drum. The selected set of screens is replaced and the upper portion lowered. Once lowered, the actuating device is activated. This will cause the drum and paddles to rotate. The nuts are placed in the hopper, which enter the drum via the open end. Once inside the drum, the paddles will impart an impact on the nuts. This impact done by the paddles will cause the nuts to crack and provide for the shell to dislodge from the meat. Once separation has occurred, the meat can easily pass through the screen while the intact nuts remain therein. The flanges, if used, are located within the drum and will aid in lifting the nuts, to help create a churn and drop motion across the rapidly turning paddles.

While the present invention has been particularly shown and described with reference to an embodiment thereof, it will be understood by those skilled in the art that various changes in form and detail may be made without departing from the spirit and scope of the present invention.

We claim:

1. A nut cracking apparatus comprising:

a housing;

a rotatable drum horizontally disposed within said housing;

an inlet extending through said housing and into said rotatable drum;

a cracking unit is rotable mounted within said rotatable drum;

an outlet extending through said housing and located beneath said rotatable drum; and at least two sets of screens;

each set of screens comprises at least one screen;

each screen from said each set includes openings for enabling a filtration process;

said openings vary in size from said each set;

at least one set of the sets of screens being selected and removably secured to said rotatable drum and at least one remaining set of the sets of screens being interchangeable therewith.

2. A nut cracking apparatus as in claim 1 wherein said drum further comprises a solid portion located in proximity to said each screen.

3. A nut cracking apparatus as in claim 1 wherein said each screen from said each set is substantially the same in size, shape and dimension.

4. A nut cracking apparatus as in claim 1 wherein said cracking unit comprises a plurality of paddles, said paddles are secured to a shaft and said shaft extends centrally through said drum.

5. A nut cracking apparatus as in claim 1 wherein a hopper is secured to said inlet.

6. A nut cracking apparatus as in claim 4 wherein said shaft and said rotatable drum is coupled to an actuation device and said actuation device enables rotation of said shaft and said rotatable drum.

7. A nut cracking apparatus as in claim 6 wherein said actuation device includes a variable speed unit for controlling rotational speed of said rotatable drum and said shaft.

8. A nut cracking apparatus as in claim 6 wherein said actuation device includes a cover for protection.

9. A nut cracking apparatus as in claim 1 wherein said housing includes a lid hingedly secured thereto for enabling access to said rotatable drum.

* * * * *